US009696975B2

(12) United States Patent
Belanger et al.

(10) Patent No.: US 9,696,975 B2
(45) Date of Patent: Jul. 4, 2017

(54) ALLOCATING REGISTER HALVES INDEPENDENTLY

(75) Inventors: David P. Belanger, Ajax (CA); Christopher A. Lapkowski, Calgary (CA); Chwan-Hang Lee, Pickering (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1102 days.

(21) Appl. No.: 12/875,753

(22) Filed: Sep. 3, 2010

(65) Prior Publication Data
US 2012/0060011 A1    Mar. 8, 2012

(51) Int. Cl.
*G06F 9/45*    (2006.01)

(52) U.S. Cl.
CPC .................................. *G06F 8/441* (2013.01)

(58) Field of Classification Search
None
See application file for complete search history.

(56) References Cited

U.S. PATENT DOCUMENTS

| | | | | |
|---|---|---|---|---|
| 4,571,678 | A * | 2/1986 | Chaitin | 717/156 |
| 4,811,269 | A * | 3/1989 | Hirose | G06F 7/5324 |
| | | | | 708/627 |
| 5,261,062 | A * | 11/1993 | Sato | 717/153 |
| 5,418,959 | A * | 5/1995 | Smith et al. | 717/151 |
| 5,446,912 | A * | 8/1995 | Colwell et al. | 712/217 |
| 5,758,116 | A * | 5/1998 | Lee et al. | 712/210 |
| 5,857,103 | A * | 1/1999 | Grove | 717/158 |
| 5,897,665 | A | 4/1999 | Padwekar | |
| 5,906,002 | A | 5/1999 | Lee | |
| 6,170,998 | B1 * | 1/2001 | Yamamoto et al. | 717/154 |
| 7,127,592 | B2 | 10/2006 | Abraham et al. | |
| 7,398,347 | B1 | 7/2008 | Pechanek et al. | |
| 7,555,636 | B2 | 6/2009 | Brenner | |
| 7,840,950 | B2 * | 11/2010 | Stoodley et al. | 717/151 |
| 8,386,754 | B2 * | 2/2013 | Blasco Allue | G06F 9/3836 |
| | | | | 712/216 |

(Continued)

OTHER PUBLICATIONS

Smith et al. "A Generalized algorithm for graph-coloring register allocation", 2004, ACM SIGPLAN Notices—PLDI '04, vol. 29, Issue 6, pp. 277-288.*

(Continued)

*Primary Examiner* — Jason Mitchell
(74) *Attorney, Agent, or Firm* — Marcia L. Doubet

(57) ABSTRACT

Register halves are allocated independently when performing register allocation during program compilation, thereby effectively doubling the number of registers which are available for allocation, which in turn may reduce spill code and improve run-time performance. When hardware registers are 64 bits wide, for example, an architecture supporting the present invention provides some number of separate hardware instructions that operate on the 32-bit high-word and/or the 32-bit low word of the hardware registers as if those 32-bit words are separate registers. Such hardware instructions are able to manipulate the register halves independently, leaving the other register half untouched. A register coloring algorithm using in the compilation process is invoked using the number of register halves, instead of the number of hardware registers.

8 Claims, 6 Drawing Sheets

(56) References Cited

U.S. PATENT DOCUMENTS

| | | | |
|---|---|---|---|
| 2001/0002483 A1* | 5/2001 | Roberts | 712/210 |
| 2002/0199086 A1* | 12/2002 | Wilson | 712/226 |
| 2002/0199090 A1* | 12/2002 | Wilson | G06F 9/30021 712/234 |
| 2004/0054873 A1* | 3/2004 | Morris | 712/210 |
| 2004/0064677 A1* | 4/2004 | Morris | 712/210 |
| 2007/0006200 A1* | 1/2007 | Renno | G06F 9/30101 717/162 |
| 2007/0124722 A1* | 5/2007 | Gschwind | G06F 8/445 717/106 |
| 2007/0162644 A1* | 7/2007 | Dabral | G06F 13/28 710/22 |
| 2007/0234012 A1* | 10/2007 | Hoflehner et al. | 712/217 |
| 2009/0064112 A1* | 3/2009 | Inagaki et al. | 717/140 |
| 2009/0182992 A1* | 7/2009 | Greiner et al. | 712/225 |
| 2011/0314260 A1* | 12/2011 | Greiner et al. | 712/205 |

OTHER PUBLICATIONS

Tallam et al. "Bitwidth Aware Global Register Allocation", 2003, ACM SIGPLAN—SIGACT symposium on Principles of programming languages '03, vol. 38 issue 1, pp. 85-96.*

Chaitin et al. "Register Allocation Via Coloring", 1981, Computer Languages, vol. 6, Issue 1, pp. 47-57.*

Lee, "Subword Parallelism with Max-2", 1996, IEEE Micro, vol. 16 Issue 4, pp. 51-59.*

Li et al. "Bit Section Instruction Set Extension of ARM for Embedded Applicatioons", 2002, CASES '02 Proceedings of the 2002 international conference on Compilers, Architecture, and synthesis for embedded systems, pp. 69-78.*

Li, Bengu et al. "Speculative Subword Register Allocation in Embedded Processors", Lecture Notes in Computer Science, vol. 3602/2005, Springer-Verlag, 2006, pp. 56-71.*

Li et al. "Bit section instructionset extension of ARM for embedded applications", 2002, Proceedings of the 2002 international conference on Compilers, architecture, and synthesis for embedded systems, pp. 69-78.*

Kondo, Masaaki, et al., "A Small, Fast and Low-Power Register File by Bit-Partitioning", Proceedings of the 11th Int'l Symposium on High-Performance Computer Architecture, IEEE Computer Society, 2005 (10 pages).

Liu, Jack, et al., "Performance Characterization of the 64-but x86 Architecture from Compiler Optimizations' Perspective", Lecture Notes in Computer Science, vol. 3293/2006, Springer-Verlag, 2006, pp. 155-169; Abstract only (1 page).

Yang, Hua, et al., "Compacting Register File via 2-Level Renaming and Bit-Partitioning", Microprocessors and Microsystems, vol. 31, Issue 3, May 1, 2007, pp. 178-187; Abstract only (3 pages).

Ehrman, John R., "eserver zSeries ("Freeway") Machines: an Assembler Programmer's View", SHARE 96 (Feb. 2001), Session 8172, IBM Corporation, 2001 (39 pages.).

Li, Bengu, "Efficient Handling of Narrow Width and Streaming Data in Embedded Applications", Doctoral Thesis, Department of Computer Science, The University of Arizona, 2006 (153 pages).

Li, Bengu, et al., "Speculative Subword Register Allocation in Embedded Processors", Lecture Notes in Computer Science, vol. 3602/2005, Springer-Verlag, 2006, pp. 56-71; Abstract only (2 pages).

Ergin, Oguz, et al., "Register Packing: Exploiting Narrow-Width Operands for Reducing Register File Pressure," micro, pp. 304-315, 37th Annual IEEE/ACM International Symposium on Microarchitecture (Micro'04), 2004; Abstract only (1 page).

Tommesani, Stefano, "MMX Arithmetic Instructions", printed from http://www.tommesani.com/MMXArithmetic.html on Sep. 3, 2010, 7 pages.

* cited by examiner

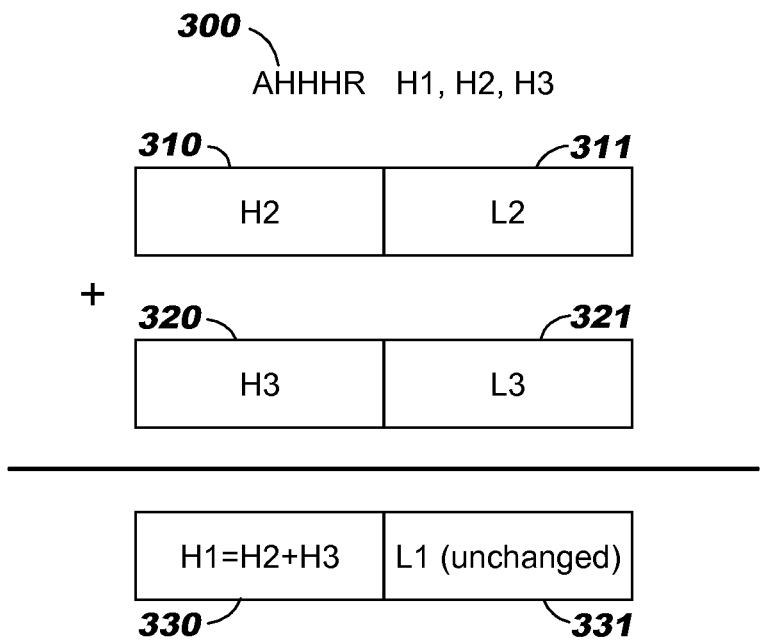

FIG. 5

500 XYZ    OpX, OpY, OpZ

510 XYZ    (grX+16, grX), (grY+16, grY), (grZ+16, grZ)

ALLOCATING REGISTER HALVES INDEPENDENTLY

BACKGROUND

The present invention relates to computing environments, and deals more particularly with compilers performing register allocation during compilation of program code, and still more particularly with allocating halves of registers independently.

One of the tasks performed by compilers is to perform register allocation. Register allocation comprises allocating hardware registers to variables, or temporary values, used by the program being compiled. Most computations performed at run time are then performed on values held in these hardware registers.

BRIEF SUMMARY

The present invention is directed to allocating registers in a computing system. In one aspect, this comprises: determining a count of hardware registers available for allocating during the compilation; doubling the determined count of hardware registers to reflect independent usage of halves of the hardware registers; and invoking a register coloring algorithm using the doubled count of hardware registers as a number of registers to be allocated. Preferably, the register coloring algorithm colors vertices of an interference graph using a number of distinct colors that is limited to the doubled count, and results of the register coloring algorithm are used for independently allocating the halves of the hardware registers.

Embodiments of these and other aspects of the present invention may be provided as methods, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

BRIEF DESCRIPTION OF THE SEVERAL VIEWS OF THE DRAWINGS

The present invention will be described with reference to the following drawings, in which like reference numbers denote the same element throughout.

FIG. 3 depicts an example of an instruction operating on the high word of registers;

FIG. 4 illustrates how hardware instructions may be provided to implement some, but not all, combinations of high-word and low-word register half allocation for a particular operation;

FIG. 5 illustrates a hypothetical instruction that may be supported by an embodiment of the present invention, where a full hardware register is needed for the operands of the instruction and the register halves are therefore allocated in pairs;

DETAILED DESCRIPTION

An embodiment of the present invention is directed toward enabling register halves to be allocated independently when performing register allocation during program compilation.

When a compile-time register allocator runs out of registers to allocate, so-called "spill code" is generated. The term "spill code" refers to code that uses values which cannot be accommodated using a conventional register approach. Commonly, spill code is directed to accessing values from memory, rather than using registers. Accessing values from memory takes considerably longer than accessing values from hardware registers, as is well known. Accordingly, executing spill code can lead to degraded run-time performance of the compiled application. Embodiments of the present invention may reduce spill code by increasing the number of registers that are available for allocation, as will be described herein.

Most processors have a small set of hardware registers, typically ranging from 8 to 32 registers. Several modern processors have 64-bit wide registers, and can perform either 32-bit or 64-bit computations. However, most applications are compiled for 32-bit mode—either for legacy/compatibility reasons, or for performance reasons. (For example, variables used to hold pointers take up less memory when referencing a location that is 32 bits wide, as compared to referencing a location that is 64 bits wide.) For these applications, computations are generally performed on 32-bit values located in the lower 32-bit word of the 64-bit wide register. The upper 32-bit word of the register is either left unmodified, or is ignored in the results.

For 32-bit applications using the lower 32-bit word, the upper half (i.e., upper word) of the 64-bit register is usually wasted. This is an inefficient use of scarce resources. According to an embodiment of the present invention, the upper and lower words of a register are allocated independently. The smallest unit of allocation becomes a register half, as opposed to allocating a full register. This effectively doubles the number of "32-bit" registers which are available for allocation. More register resources can then be provided to the register allocator, with the goal of obtaining an overall better register allocation and a reduction in the number of register spills. Performance improvements may be seen with 32-bit applications (for example, due to the decreased likelihood of executing spill code).

Figure 1:
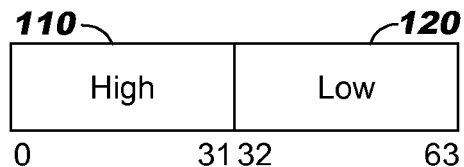
FIG. 1 illustrates a 64-bit hardware register, and further illustrates a high-word register half and a low-word register half for allocation according to an embodiment of the present invention.

FIG. 1 illustrates a 64-bit hardware register 100 divided into a high word 110 (numbered as bits 0 through 31) and a low word 120 (numbered as bits 32 through 63). An embodiment of the present invention considers this 64-bit register as two 32-bit registers, each able to contain an independent 32-bit value. (The terms "high word" and "high-word register half" are used interchangeably herein when referring to the allocation of register halves, as are the terms "low word" and "low-word register half".)

Figure 2:
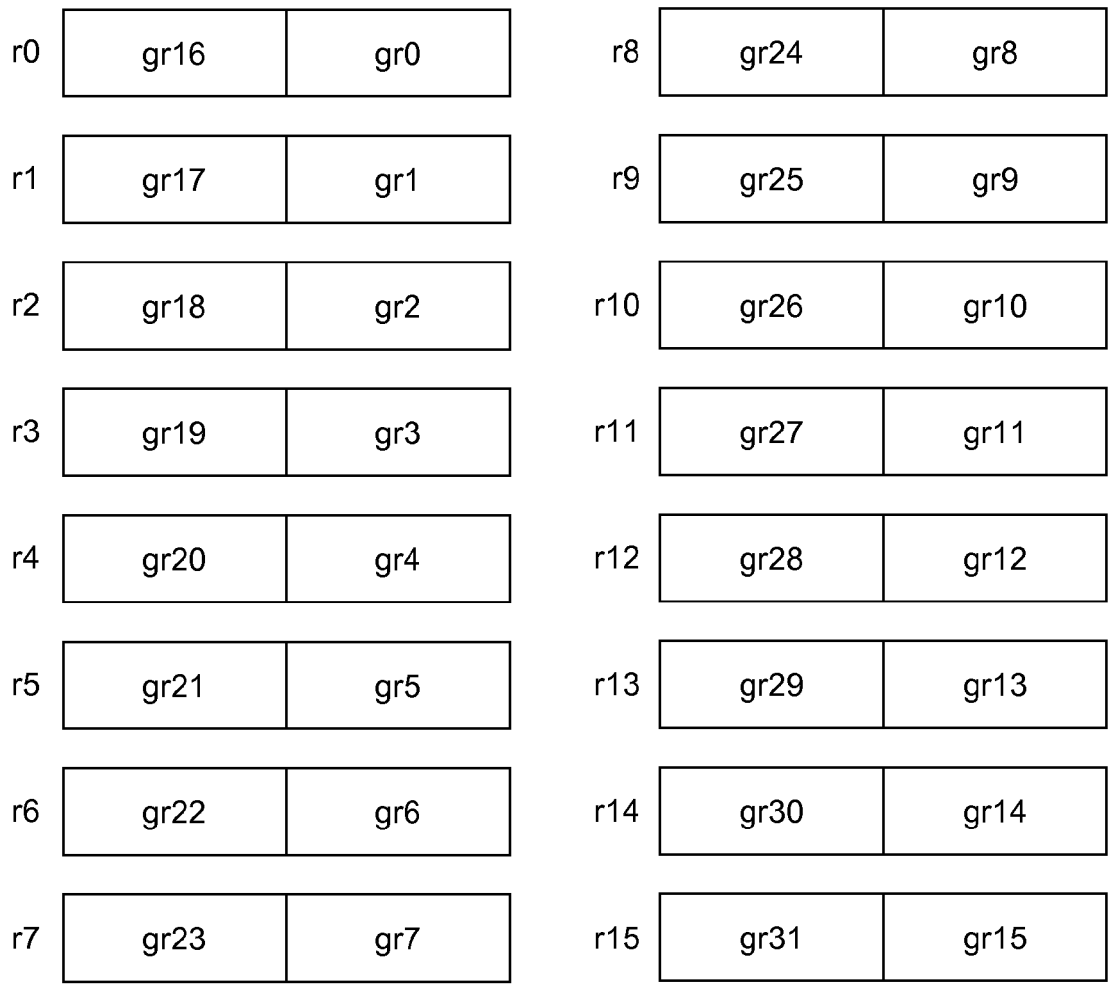
FIG. 2 illustrates a set of 16 hardware registers, and logically dividing each of these 16 registers into a high word and a low word according to an embodiment of the present invention.

Each word of the 64-bit register is considered to be modifiable independently of the other word, and each word will be allocated independently of the other. As noted earlier, this effectively doubles the number of available registers for computation. Referring now to FIG. 2, a set of 16 hardware registers are illustrated, where these registers are referred to as "r0" through "r15". FIG. 2 further illustrates logically dividing each of these 16 registers into a high word and a low word. For distinguishing between actual 64-bit hardware registers and the 32-bit register halves used by an embodiment of the present invention, an "r" prefix is used herein when referring to the 64-bit registers and a "gr" prefix is used herein when referring to the 32-bit register halves. Accordingly, the 16 register halves which use the low words from the 64-bit registers are labelled in FIG. 2 as "gr0" through "gr15", and the 16 register halves which use the high words from the 64-bit registers are labelled in FIG. 2 as "gr16" through "gr31". For example, "gr0" is the low word of register "r0", and "gr1" is the low word of register "r1", and so forth through "gr15" which is the low word of register "r15". Similarly, "gr16" is the high word of register "r0"; "gr17" is the high word of register "r1"; and "gr31" is the high word of register "r15".

Preferably, an embodiment of the present invention is used with an architecture that provides separate hardware instructions that operate on 32-bit registers. With the support of hardware instructions that are able to manipulate halves of 64-bit registers while leaving the other register half untouched, an embodiment of the present invention takes advantage of the conceptually doubled number of available registers.

Suppose, by way of example, that a hardware instruction is provided which performs addition of values stored in two high-word register halves and stores the result in a third high-word register half. A resource allocator according to an embodiment of the present invention may then allocate 3 high-word register halves to this add instruction, leaving the corresponding 3 low-word register halves available for storing other values. The sample instruction may be specified, by way of example, using an operation code (or "opcode") of "AHHHR", where the "A" signifies an add instruction, the "R" signifies addition using registers, and the "HHH" signifies that each of 3 operands of this instruction are to be allocated to high-word register halves. An example of register allocation for this instruction is illustrated in FIG. 3, where the operands of the add instruction are denoted as H1, H2, and H3. See reference number 300. For this sample instruction 300, FIG. 3 shows a high word denoted "H2" at reference number 310 being added to a high word denoted "H3" at reference number 320, where the result of this addition is then stored in a high word denoted "H1" at reference number 330. Neither of the low words "L2" 311 or "L3" 321 are used as input during this add instruction, and the low word "L1" 331 remains unchanged following this add instruction. That is, while the addition result is stored into the high-word register half of a particular hardware register, the low-word register half of that particular hardware register is not reset or cleared by the storing of the sum into the high word.

Suppose, as another example, that a hardware instruction is provided which uses a high word for some of its operands and a low word for other operands. A resource allocator according to an embodiment of the present invention may then allocate the register halves to the instruction according to the opcode. The sample instruction may be specified, by way of example, using an opcode of "AHLHR", where the "A" and "R" signify register addition and the "HLH" signifies that the first and third operands of this instruction are to be allocated to high-word register halves while the second operand is to be allocated to a low-word register half.

Register allocation during the compilation process is commonly performed using a register coloring algorithm. Register coloring algorithms typically comprise building a graph with vertices representing each distinct variable used in a program unit to be compiled and using so-called "interference edges" to connect variables that are "live" (i.e., in use) concurrently. The graph may also be referred to as an "interference graph". Two vertices sharing an interference edge are assigned different colors by the coloring algorithm. Details of how a register coloring algorithm works are known in the art, and are therefore omitted herein. According to an embodiment of the present invention, however, the algorithm is invoked with a register count that is double the number of actual hardware registers, thus reflecting a register allocation strategy using register halves as disclosed herein and causing the coloring algorithm to double the number of colors it uses (as compared to the number of colors used when allocating the hardware registers). The coloring algorithm is then performed with regard to allocation units corresponding to the register halves (and not with regard to full registers, in contrast to traditional register allocation). This approach to register allocation reflects the fact that at any point in the program unit to be compiled, each 64-bit register can hold up to two live 32-bit values that do not have to be related in any way and that can, in fact, be values of two distinct variables.

Several issues that may arise, and a preferred way of dealing with them, will now be discussed.

There may be situations where a hardware instruction is not available that will operate on the high word independently from the low word, such that a high-word register half cannot be used. As one example, it might not be safe to store the product of a multiplication into a high word because of the possibility of overflow. In situations where a high-word register half is not suitable, the allocated register is therefore restricted to a choice from among the low-word register halves. The resource allocation for this scenario is preferably implemented by adding an interference to the register coloring graph between the variable of interest and each of the high-word register halves. Similarly, if it is desired to restrict a register allocation to use a high-word register half, an interference is preferably added between the variable of interest and each of the low-word register halves.

For instructions that take more than one operand, there may be situations where the choice of whether to use a high word or a low word for one operand of the instruction depends on whether a high word or a low word was used for other operand(s) of that instruction. Multiple op codes may be supported for a particular type of operation, where the op codes for the operation use a syntax—such as a suffix—that signifies how the register halves may be allocated for the operation. Suppose, by way of example, that hardware instructions are available to implement the 3 operations as shown at 400, 410, 420 in FIG. 4, but that no hardware instruction is available to implement the operation shown at 430. Further suppose that the op codes, in this example, signify different register allocation choices for an ADD operation. Op cope "op1" might then be specified as ADDLL, whereas op code "op2" might be specified as ADDHH, and op code "op3" might be specified as ADDHL. In the example of FIG. 4, an op code of ADDLH, corresponding to op code "op4" at 430, is not supported. This example demonstrates that what is allowed for the first operand depends on what was used for the second operand and vice versa, and also illustrates that the difference between the sample operations "op1", "op2", "op3", and "op4" is in how the register halves are allocated (and not in the operation which is performed on the contents of the registers). The resource allocation for this scenario is preferably implemented by using a register pairing approach, or using artificial interferences, as will now be discussed.

With register pairing, the two operands are paired together and a group type is associated with the pair. (Support for groups is commonly available in resource coloring algorithms. Optionally, support for a group type attribute may be added.) When the register coloring operation is ready to color the pair, it checks for the group type and selects one of the valid combination of colors. To ensure that a coloring can be achieved for the pair, register copy instructions may be inserted prior to the coloring in order to break, or split, the live range. (Unneeded register copy instructions may be subsequently removed using optimizations that are performed after register allocation. Optimizations may also be performed in other scenarios, if desired, to improve the generated assembly language code or machine language code.)

With the "artificial" interferences technique, one (or more) operand is restricted to either a low word or a high word, and the remaining operands will not have any high/low word restrictions, in a way that a valid register allocation from coloring will be achieved. The coloring is restricted by adding an interference to the register coloring graph between the variable of interest and each of the register halves which are to be avoided (that is, register halves which are not supported). Suppose, with reference to the example in FIG. 4, that the second operand is restricted to a selection from among the low-word register halves. As shown at 400 and 420, the first operand can then use either a high-word register half or a low-word register half. In this case, artificial interferences can be added to the register coloring graph to cause interference between the second operand and all high-word registers, which forces the second operand to use a low-word register. By restricting the second operand to a low-word, valid combinations from 400 and 420 can be obtained from register coloring. The unsupported combination at 430 will be prevented. Note that this artificial interferences technique will also prevent the allocation combination shown at 410, which is a valid combination for this operation. This is a drawback of the artificial interference technique. However, an advantage of the artificial interference technique as contrasted to the above-described register pairing technique is that artificial interference does not require the introduction of new pair types, and it is therefore simpler to implement.

There may be situations where some programs which are compiled to use 32-bit operations perform 64-bit computations on data. The 64-bit data value can be viewed as 2 related 32-bit parts, namely the high word and the low word of the 64-bit data value. Because the 2 parts are related, they are preferably allocated in the same hardware register, and will then use a 64-bit hardware instruction. The resource allocation for this scenario is preferably implemented by using a high-low register pair of the form (grX+16, grX), where X takes on values 0 through 15. The high and low registers, in this scenario, map to the same hardware register. As one example, a sample high-low register pair when using this approach is (gr16, gr0).

Suppose, by way of illustration, that an instruction "XYZ" uses 3 operands, where some mathematical operation is performed on 2 64-bit values specified as the second and third operands of the instruction, and the result of this mathematical operation is stored into the first operand of the "XYZ" instruction. This hypothetical instruction is illustrated at reference number 500 in FIG. 5. Because the opcode "XYZ" will be recognized by the compiler as using 64-bit operands, the resource allocation for this scenario is preferably implemented by allocating both halves of a single 64-bit hardware register for each operand. This is illustrated at reference number 510 in FIG. 5, where a hardware register "X" is allocated for the first operand, a hardware register "Y" is allocated for the second operand, and a hardware register "Z" is allocated for the third operand. According to an embodiment of the present invention, the register coloring algorithm treats the operands as register pairs for coloring purposes, using techniques similar to register coloring when 64-bit hardware registers are allocated as pairs.

Figure 6A:
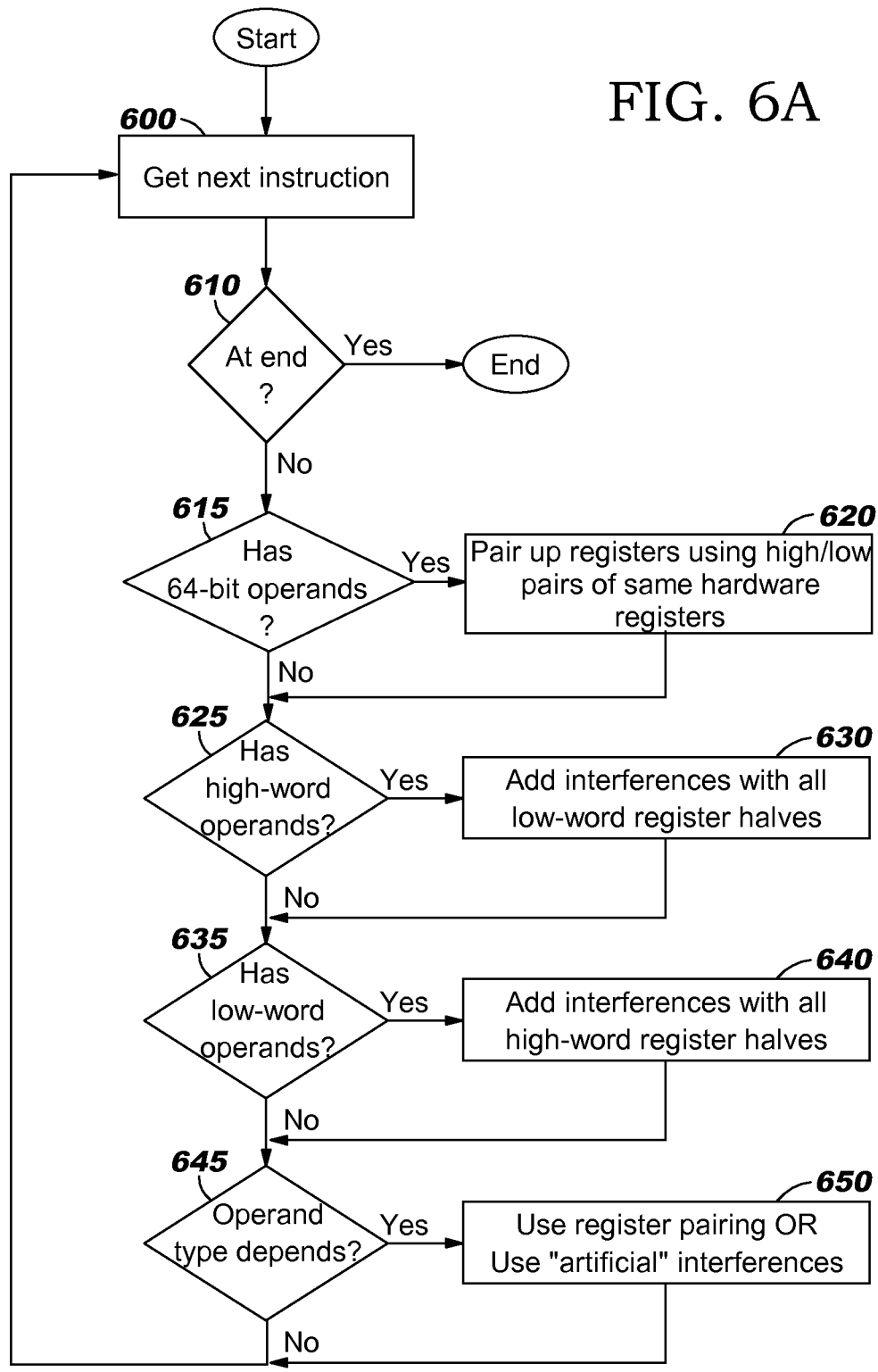
FIG. 6 (comprising FIGS. 6A and 6B) provides flowcharts depicting logic which may be used when implementing an embodiment of the present invention.

FIG. 6 provides flowcharts illustrating logic which may be used when implementing an embodiment of the present invention for register allocation. Referring first to FIG. 6A, logic is depicted which may be used for updating an interference graph and register pairing list for high-word and low-word instructions. Block 600 obtains the next instruction from a program unit to be compiled. Block 610 tests whether the program unit is at the end, and if so, processing of FIG. 6A exits. Otherwise, processing continues at Block 615.

Block 615 tests whether the obtained instruction has 64-bit operands. A table or other data structure listing the op codes of interest may be consulted to make this determination. With reference to the sample instruction in FIG. 5, for example, the op code "XYZ" indicates that the 3 operands of this instruction are to be allocated to full 64-bit hardware registers, and the test at Block 615 would therefore have a positive result upon encountering the "XYZ" op code. Accordingly, when the test at Block 615 has a positive result, registers are paired up at Block 620 using high/low pairs of the same hardware register, and processing continues at Block 625 to perform further evaluations on the operands of the instruction.

Block 625 tests whether the obtained instruction has high-word operands. A table or other data structure listing the op codes of interest may be consulted to make this determination. With reference to the sample instruction in FIG. 3, for example, the op code "AHHHR" indicates that the 3 operands of this instruction are to be allocated to high-word register halves, and the test at Block 625 would therefore have a positive result upon encountering the "AHHHR" op code. Accordingly, when the test in Block 625 has a positive result, Block 630 updates the interference graph by adding interferences with all low-word register halves, and processing continues at Block 635.

Block 635 tests whether the obtained instruction has low-word operands. If so, then Block 640 adds interferences with all high-word register halves, and processing then continues at Block 645.

Block 645 tests whether the operand type of the obtained instruction (i.e., high vs. low) depends on other operands. If so, then Block 650 uses one of the above-described register pairing or artificial interference techniques for updating the interference graph, and control then returns to Block 600. (Although not shown in FIG. 6A, when the test in Block 645 has a negative result, conventional techniques may be used for the obtained instruction in this case prior to returning control to Block 600.)

Figure 6B:
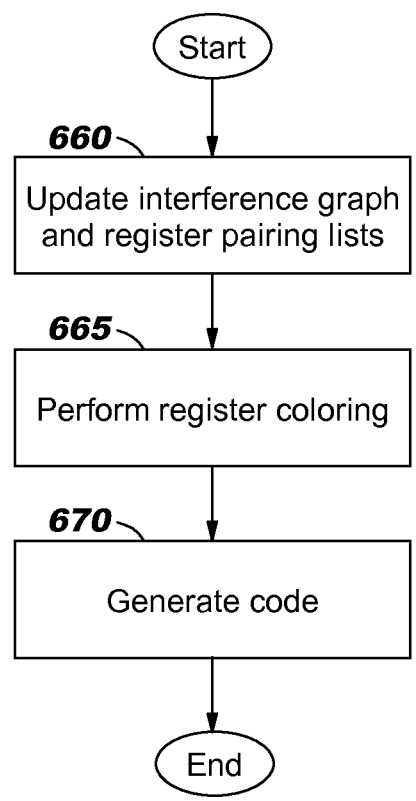

Turning now to FIG. 6B, the processing shown therein begins at Block 660 by updating the interference graph and register pairing links. This process has been discussed above with reference to FIG. 6A. Register coloring is then performed at Block 665, after which results of the register coloring are used at Block 670 when generating code. The processing of FIG. 6B then exits.

As can be seen in view of the above disclosure, allocating register halves independently effectively doubles the number of registers available for allocation by the register coloring algorithm (causing the cardinality of colors used by the coloring algorithm to double), leading to a reduced number of register spill situations and improving performance accordingly.

Figure 7:
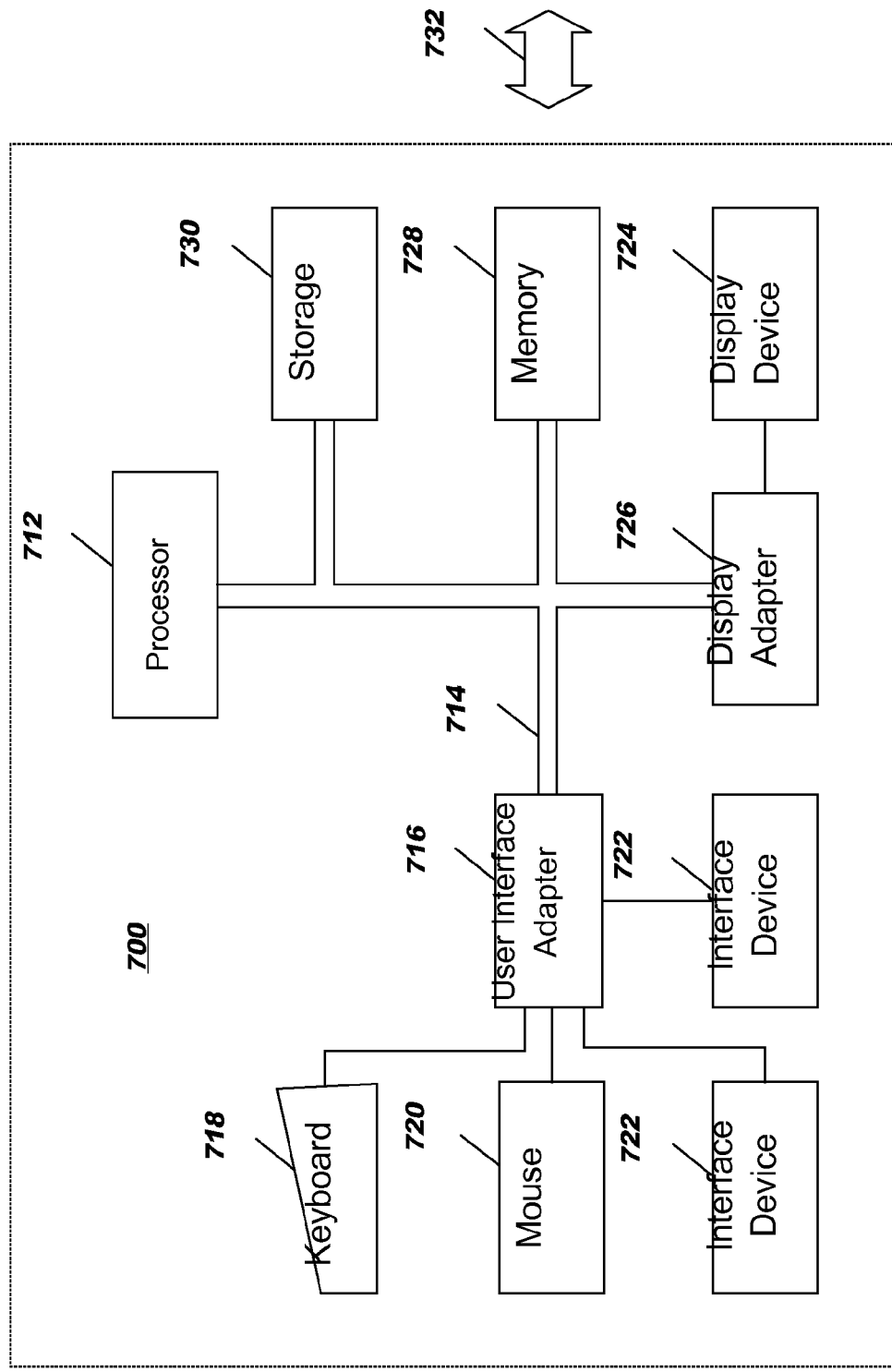
FIG. 7 depicts a data processing system suitable for storing and/or executing program code.

Referring now to FIG. 7, a data processing system 700 suitable for storing and/or executing program code includes at least one processor 712 coupled directly or indirectly to memory elements through a system bus 714. The memory elements can include local memory 728 employed during actual execution of the program code, bulk storage 730, and cache memories (not shown) which provide temporary storage of at least some program code in order to reduce the number of times code must be retrieved from bulk storage during execution.

Input/output ("I/O") devices (including but not limited to keyboards 718, displays 724, pointing devices 720, other interface devices 722, etc.) can be coupled to the system either directly or through intervening I/O controllers or adapters (716, 726).

Network adapters may also be coupled to the system to enable the data processing system to become coupled to other data processing systems or remote printers or storage devices through intervening private or public networks (as shown generally at 732). Modems, cable modem attachments, wireless adapters, and Ethernet cards are just a few of the currently-available types of network adapters.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on a user's computing device and partly on a remote computer. The remote computer may be connected to the user's computing device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A computer-implemented method of allocating registers in a computing system during compilation of program code, comprising:
   determining a count of hardware registers available for allocating during the compilation;
   doubling the determined count of hardware registers to reflect independent usage of halves of the hardware registers;
   invoking a register coloring algorithm to build an interference graph using the doubled count of hardware registers as a number of registers to be allocated, wherein building the interference graph further comprises:
     programmatically consulting a data structure that specifies, for each of a plurality of operation codes in the program code to be compiled, restrictions on allocating operands of the operation code to hardware registers;
     responsive to the programmatically consulting determining that a selected operand of a particular operation code must use a full hardware register, causing an allocator to allocate both a high-word half and a low-word half of a hardware register to the selected operand;
     responsive to the programmatically consulting determining that the selected operand is allocatable to a register half and must use the high-word half of a hardware register, adding an interference to the interference graph between the selected operand and all low-word halves of the hardware registers to force the selected operand to be allocated to a high-word register half; and
     responsive to the programmatically consulting determining that the selected operand is allocatable to a register half and must use the low-word half of a hardware register, adding an interference to the interference graph between the selected operand and all high-word halves of the hardware registers to force the selected operand to be allocated to a low-word register half; and
   independently allocating the halves of the hardware registers by the allocator, when generating compiled program code during the compilation, according to results of the register coloring algorithm, thereby causing the compiled program code to specify concurrently storing, in at least one of the hardware registers, a first operand in the high-word half of the hardware register and a second operand in the low-word half of the hardware register, the first and second operands being distinct from and unrelated to one another.

2. The method according to claim 1, wherein the register coloring algorithm colors vertices of the interference graph using a number of distinct colors that is limited to the doubled count.

3. The method according to claim 1, wherein:
   adding the interference to the interference graph between the selected operand and all low-word halves of the hardware registers comprises adding the interference to vertices of the interference graph; and
   adding the interference to the interference graph between the selected operand and all high-word halves of the hardware registers comprises adding the interference to vertices of the interference graph.

4. A system for allocating registers in a computing system during compilation of program code, comprising:
   a computer comprising a processor; and
   instructions which are executable, using the processor, to implement functions comprising:
     determining a count of hardware registers available for allocating during the compilation;
     doubling the determined count of hardware registers to reflect independent usage of halves of the hardware registers;
     invoking a register coloring algorithm to build an interference graph using the doubled count of hardware registers as a number of registers to be allocated, wherein building the interference graph further comprises:
       programmatically consulting a data structure that specifies, for each of a plurality of operation codes in the program code to be compiled, restrictions on allocating operands of the operation code to hardware registers;
       responsive to the programmatically consulting determining that a selected operand of a particular operation code must use a full hardware register, causing an allocator to allocate both a high-word half and a low-word half of a hardware register to the selected operand;
       responsive to the programmatically consulting determining that the selected operand is allocatable to a register half and must use the high-word half of a hardware register, adding an interference to the interference graph between the selected operand and all low-word halves of the hardware registers to force the selected operand to be allocated to a high-word register half; and
       responsive to the programmatically consulting determining that the selected operand is allocatable to a register half and must use the low-word half of a hardware register, adding an interference to the interference graph between the selected operand and all high-word halves of the hardware registers to force the selected operand to be allocated to a low-word register half; and
     independently allocating the halves of the hardware registers by the allocator, when generating compiled program code during the compilation, according to results of the register coloring algorithm, thereby causing the compiled program code to specify concurrently storing, in at least one of the hardware registers, a first operand in the high-word half of the hardware register and a second operand in the low-word half of the hardware register, the first and second operands being distinct from and unrelated to one another.

5. The system according to claim 4, wherein the register coloring algorithm colors vertices of the interference graph using a number of distinct colors that is limited to the doubled count.

6. The system according to claim 4, wherein:
adding the interference to the interference graph between the selected operand and all low-word halves of the hardware registers comprises adding the interference to vertices of the interference graph; and
adding the interference to the interference graph between the selected operand and all high-word halves of the hardware registers comprises adding the interference to vertices of the interference graph.

7. A computer program product for allocating registers in a computing system during compilation of program code, the computer program product comprising:
a non-transitory computer readable storage medium having computer readable program code embodied therein, the computer readable program code configured for:
determining a count of hardware registers available for allocating during the compilation;
doubling the determined count of hardware registers to reflect independent usage of halves of the hardware registers;
invoking a register coloring algorithm to build an interference graph using the doubled count of hardware registers as a number of registers to be allocated, wherein building the interference graph further comprises:
programmatically consulting a data structure that specifies, for each of a plurality of operation codes in the program code to be compiled, restrictions on allocating operands of the operation code to hardware registers;
responsive to the programmatically consulting determining that a selected operand of a particular operation code must use a full hardware register, causing an allocator to allocate both a high-word half and a low-word half of a hardware register to the selected operand;
responsive to the programmatically consulting determining that the selected operand is allocatable to a register half and must use the high-word half of a hardware register, adding an interference to the interference graph between the selected operand and all low-word halves of the hardware registers to force the selected operand to be allocated to a high-word register half; and
responsive to the programmatically consulting determining that the selected operand is allocatable to a register half and must use the low-word half of a hardware register, adding an interference to the interference graph between the selected operand and all high-word halves of the hardware registers to force the selected operand to be allocated to a low-word register half; and
independently allocating the halves of the hardware registers by the allocator, when generating compiled program code during the compilation, according to results of the register coloring algorithm, thereby causing the compiled program code to specify concurrently storing, in at least one of the hardware registers, a first operand in the high-word half of the hardware register and a second operand in the low-word half of the hardware register, the first and second operands being distinct from and unrelated to one another.

8. The computer program product according to claim 7, wherein the register coloring algorithm colors vertices of the interference graph using a number of distinct colors that is limited to the doubled count.

* * * * *